United States Patent [19]
Sakowski

[11] 3,954,948
[45] *May 4, 1976

[54] PROCESS FOR MANUFACTURE OF CALCIUM HYPOCHLORITE

[75] Inventor: Walter J. Sakowski, Cleveland, Ohio

[73] Assignee: Olin Corporation, New Haven, Conn.

[ * ] Notice: The portion of the term of this patent subsequent to July 15, 1992, has been disclaimed.

[22] Filed: Jan. 6, 1975

[21] Appl. No.: 538,682

Related U.S. Application Data

[60] Division of Ser. No. 340,121, March 12, 1973, Pat. No. 3,895,099, and a continuation-in-part of Ser. No. 257,768, May 30, 1972, abandoned.

[52] U.S. Cl............................. 423/474; 423/163; 423/473; 423/499
[51] Int. Cl.² ........................................ C01B 11/06
[58] Field of Search ............ 423/474, 499, 473, 163

[56] References Cited
UNITED STATES PATENTS

| | | | |
|---|---|---|---|
| 1,713,669 | 5/1929 | MacMullin et al. | 423/474 |
| 1,718,285 | 6/1929 | George | 423/474 |
| 1,784,286 | 12/1930 | Hershman | 423/474 |
| 1,931,622 | 10/1933 | Reitz et al. | 423/474 |
| 2,195,755 | 4/1940 | Robson et al. | 423/474 |
| 3,134,641 | 5/1964 | Gleichert | 423/474 |
| 3,241,912 | 3/1966 | Nicolaisen | 423/474 |
| 3,251,647 | 5/1966 | Nicolaisen | 423/474 |
| 3,572,989 | 3/1971 | Tatara et al. | 423/474 |
| 3,645,005 | 2/1972 | Dychdala | 423/474 X |
| 3,767,775 | 10/1973 | Tatara et al. | 423/474 |

Primary Examiner—Edward Stern
Attorney, Agent, or Firm—Donald F. Clements; T. P. O'Day; James B. Haglind

[57] ABSTRACT

A continuous process for the manufacture of calcium hypochlorite in which an aqueous slurry of lime and sodium hypochlorite is chlorinated in a mixing zone to form a sodium chloride solution containing large crystals of calcium hypochlorite which are readily separated and dried. The resulting solution containing some dissolved calcium hypochlorite is reacted with an alkali metal hydroxide to precipitate lime, which is separated and recycled to the mixing zone slurry. The lime-free solution may be used as bleach liquor or processed to precipitate solid salt useful in the preparation of brine. The remaining solution is recycled to the mixing zone slurry. Purification of fresh lime is also disclosed.

The process provides an improved separation of calcium hypochlorite and sodium chloride, and recycles all solutions to minimize pollution of water resources.

20 Claims, 3 Drawing Figures

PROCESS FOR MANUFACTURE OF CALCIUM HYPOCHLORITE

This is a division of application Ser. No. 340,121, filed Mar. 12, 1973, now U.S. Pat. No. 3,895,099, issued July 15, 1975.

This application is a continuation-in-part of U.S. Ser. NO. 257,768, filed May 30, 1972, now abandoned.

This invention relates to the manufacture of calcium hypochlorite by an improved continuous process having the advantage of producing calcium hypochlorite of high purity and available chlorine content. Calcium hypochlorite is a commercial bleaching and sanitizing agent used particularly in the disinfection of swimming pool waters.

A variety of processes and modifications are known in the art for manufacturing calcium hypochlorite.

U.S. Pat. No. 1,713,669, issued to Robert B. Mac-Mullin et al on May 21, 1929, discloses a process in which an aqueous slurry of lime is chlorinated, solid impurities are removed, and caustic and chlorine are added to produce calcium hypochlorite and alkali chloride. The concentration of the calcium hypochlorite-alkali chloride mixture is kept dilute so that the alkali chloride remains in solution while the calcium hypochlorite is precipitated. After separation of the solid calcium hypochlorite, the filtrate may be treated with lime to form basic calcium hypochlorite or used as bleach liquor.

U.S. Pat. No. 1,718,284, issued to Anthony George et al on June 25, 1929, describes a process in which lime and caustic soda are added to an eutectic solution of sodium chloride and calcium hypochlorite, the mixture is chlorinated and sodium chloride is quickly precipitated and separated from an unstable solution of calcium hypochlorite. Calcium hypoclorite is then precipitated. In a alternate embodiment, sodium hypochlorite and lime are chlorinated in a eutectic solution of sodium chloride and calcium hypochlorite with the sodium chloride and calcium hypochlorite being precipitated and separated sequentially as described above.

U.S. Pat. No. 1,718,285, issued to Anthony George on June 25, 1929, discloses a process for chlorinating an aqueous slurry of lime in the presence of a solution of sodium hypochlorite to form a slurry of calcium hypochlorite. The slurry is evaporated to dryness to recover calcium hypochlorite, or alternatively the calcium hypochlorite is precipitated from a dilute NaCl solution, then separated and dried.

A process for calcium hypochlorite manufacture is disclosed in U.S. Pat. No. 3,572,989, issued to Seiji Tartara et al on Mar. 30, 1971, in which concentrated sodium hydroxide is added to an aqueous solution saturated with calcium hypochlorite and sodium chloride, and in a first step, the mixture is chlorinated and sodium chloride crystals are removed. In a second step, slaked lime and water are added to the reaction mixture and the mixture is chlorinated. The resulting calcium hypochlorite crystals are separated, and the mother liquor is recycled to the first step.

In all of the above processes the separation of calcium hypochlorite from sodium chloride takes place by either a. precipitating sodium chloride from a metastable solution of calcium hypochlorite where the separation must be carried out quickly to be effective, or b. precipitating calcium hypochlorite from sodium chloride in solutions which must be very dilute to hold the sodium chloride in solution.

In both (a) and (b) above, there is a loss of product by coprecipitation or incomplete precipitation and in (b) above, there is the necessity to treat or dispose of large volumes of a dilute sodium chloride solution.

The above processes generally require lime of high purity (94–95% $Ca(OH)_2$) to provide a commercially acceptable product, and in addition, require relatively low temperatures, 10°–20°C., during the chlorination steps.

It is an object of the present invention to provide an improved continuous process for the manufacture of calcium hypochlorite.

Another object of the invention is to provide an improved calcium hypochlorite process wherein large crystals of calcium hypochlorite dihydrate form, which are readily separated from solution and easily dried.

An additional object of this invention is to provide an improved calcium hypochlorite process which permits the use of low grade or impure lime, thereby resulting in a considerable reduction in the cost of raw materials.

It is a further object of this invention to provide a means of operating the chlorination steps of a calcium hypochlorite process with reduced cooling requirements, and thus reduce the costs for refrigeration equipment.

Another object of this invention is to provide a means of minimizing pollution of water resources in a calcium hypochlorite process by recycling substantially all process streams and eliminating the need for disposing of contaminating liquids to sewer systems or public water ways.

Still a further object of this invention is to provide an improved process for preparing calcium hypochlorite wherein filtration operations which remove insoluble materials are carried out in stable solutions where processing times are not critical to the composition of the final product.

These and other objects of the invention are accomplished in a continuous process for preparing calcium hypochlorite which comprises the steps of:

a. admixing lime, an alkali metal hypochlorite and water in a mixing zone to form a mixing zone slurry, b. reacting this mixing zone slurry with chlorine to effect precipitation of calcium hypochlorite therein and thus form a paste of solid calcium hypochlorite particles suspended in a paste liquor comprised of an aqueous solution predominating in the chloride of said alkali metal and containing some dissolved calcium hypochlorite, c. continuously withdrawing a portion of said paste and separating it into
   1. said paste liquor, and
   2. a moist cake of calcium hypochlorite particles d. reacting said paste liquor with a hydroxide of said alkali metal to form a lime slurry by precipitating lime in a mother liquor containing the chloride and hypochlorite of said alkali metal, e. separating at least a portion of said mother liquor from said lime slurry, and f. recycling said precipitated lime to said mixing zone.

In a preferred embodiment of the invention the moist cake of calcium hypochlorite particles is heated to reduce the water content to desired levels and the dried particles are then stored in suitable containers for use in water treatment. Because of the relatively large particle size of the calcium hypochlorite particles prepared by the process of this invention, they are easily separated from the paste liquor and easily dried, as discussed more fully below.

In another preferred embodiment of the invention, mother liquor separated from the precipitated lime is reacted with a hydroxide of an alkali metal and chlorine and sufficient water is evaporated to effect precipitation of the chloride salt of the alkali metal in an aqueous solution of the hypochlorite of the alkali metal. The solid chloride salt is separated for use in preparing brine for electrolytic chlorine cells and the resulting aqueous alkali metal hypochlorite solution is recycled to the mixing zone. As a result, all liquid streams are recycled in this embodiment of the process and there are no impure waste streams that must be disposed of, thereby avoiding serious pollution problems.

Alkali metal hypochlorites and alkali metal hydroxides are employed as reactants in the present invention, and one of the products is alkali metal chloride. In order to simplify the disclosure, the invention will be described hereinafter in terms of "sodium hypochlorite", "sodium hydroxide" and "sodium chloride". However, those skilled in the art will recognize that any other suitable alkali metal hypochlorite such as potassium hypochlorite or any other suitable alkali metal hydroxide such as potassium hydroxide can serve as a substitute or partial replacement for the corresponding sodium compounds. In this event, one of the products will be potassium chloride. In order to simplify process conditions, it is preferred to employ either all sodium compounds or all potassium compounds. However, the process can also be operated with a mixture of these alkali metal compounds if the efficiency of separating products is not important to the operation.

FIGS. 1 thru 3 illustrate several embodiments of the present invention.

Figure 1:
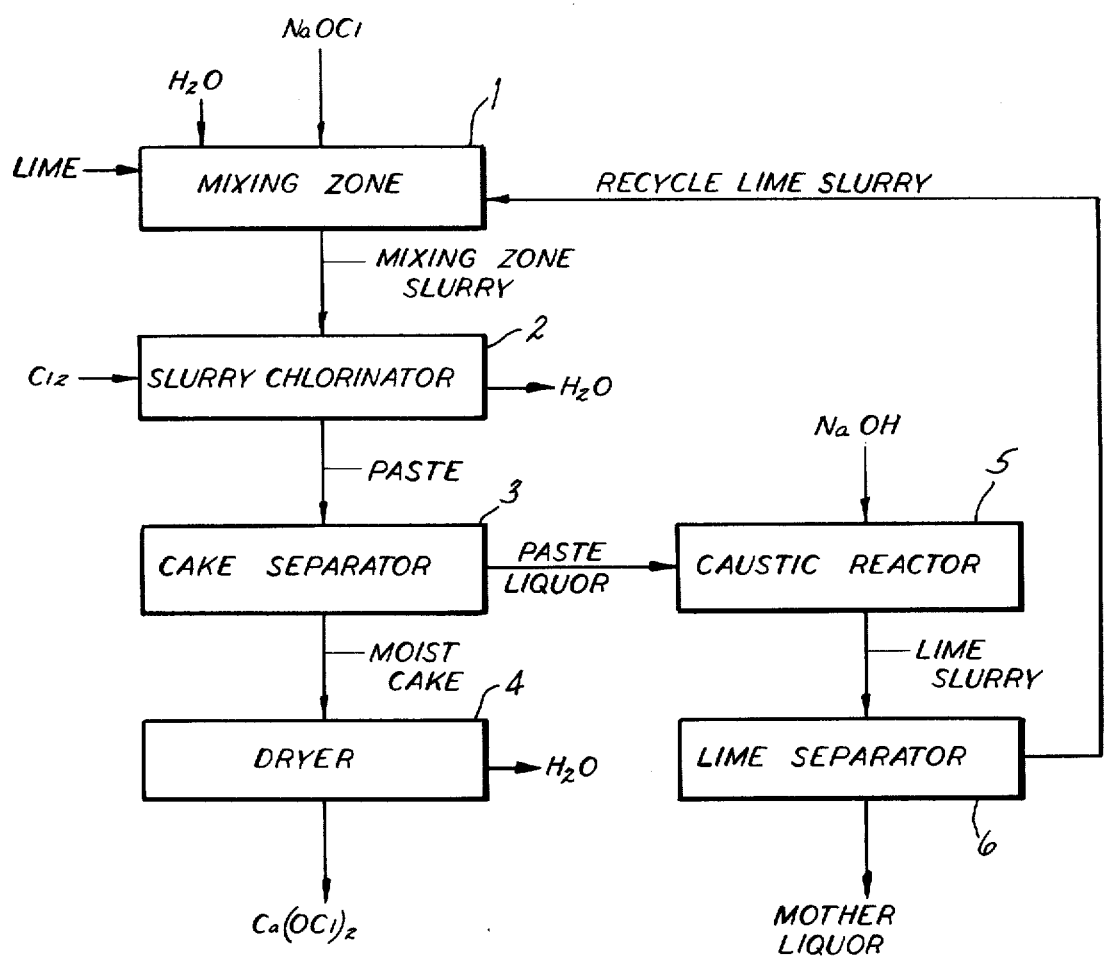
FIG. 1 is a flow sheet of one embodiment of the present invention, showing the separation of calcium hypochlorite and recycle of precipitated lime.

More in detail in the process of FIG. 1, lime (both fresh lime and recycle lime of the type described more fully below), water and sodium hypochlorite are admixed in mixing zone 1 to form a mixing zone slurry. Mixing zone 1 is a mixing tank or other suitable container with agitation means for blending the various components fed thereto. There may be some degree of reaction between the various components fed to mixing zone 1, especially in the embodiment described below in FIG. 3. However, an important function of mixing zone 1 is to admix the components, and therefore it is referred to as a "mixing zone", even though some "reaction" may occur in some embodiments of the invention.

The resulting mixing zone slurry is conveyed to slurry chlorinator 2 and reacted with chlorine. Slurry chlorinator 2 is any suitable chlorination apparatus provided with agitation means for maximum contact between chlorine and slurry. It is preferred to employ as slurry chlorinator 2 an evaporator chlorinator which utilizes the chlorination technique described in U.S. Pat. No. 3,241,912, issued to Bernard H. Nicolaisen on Mar. 22, 1966. Temperature within slurry chlorinator 2 is maintained within the range from about 0° to about 35° and preferably from about 20° to about 30°C.

During chlorination of the slurry in slurry chlorinator 2, lime reacts with chlorine to form calcium hypochlorite dihydrate in accordance with Equation (1):

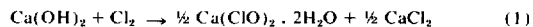

$$Ca(OH)_2 + Cl_2 \rightarrow \tfrac{1}{2} Ca(ClO)_2 \cdot 2H_2O + \tfrac{1}{2} CaCl_2 \qquad (1)$$

Some sodium hydroxide may be present in the mixing zone slurry as a result of feeding sodium hydroxide (not shown) to mixing zone 1, or it may be present in the recycle lime slurry fed to mixing zone 1. Any sodium hydroxide present in the slurry chlorinator 2 is reacted with chlorine to form sodium hypochlorite in accordance with Equation (2):

$$2NaOH + Cl_2 \rightarrow NaClO + NaCl + H_2O \qquad (2)$$

Sodium hypochlorite present in slurry chlorinator 2 reacts with calcium chloride to form sodium chloride and additional calcium hypochlorite in accordance with Equation (3):

$$NaClO + \tfrac{1}{2} CaCl_2 \rightarrow \tfrac{1}{2} Ca(ClO)_2 + NaCl \qquad (3)$$

The primary products of slurry chlorinator 2 are calcium hypochlorite, sodium chloride and water. At start-up of the process it is preferred to fill slurry chlorinator 2 with a slurry or "paste" of calcium hypochlorite solids suspended in an aqueous solution of sodium chloride and calcium hypochlorite, with an excess lime or other alkali concentration in the slurry being less than about 1.0 and preferably less than about 0.50 percent by weight. The rate of feed of mixing zone slurry and chlorine to slurry chlorinator 2 and rate of evaporation of water, if any, are adjusted to maintain the concentration of unreacted lime or other alkali during the reaction below about 1.0 percent. Continuous chlorination of the slurry in this manner causes the formation of coarse calcium hypochlorite crystals which are much more easily separated from paste liquor in cake separator 3, than are calcium hypochlorite crystals separated in a conventional triple salt process or a batch type process.

A portion of the resulting "paste" comprised of solid calcium hypochlorite and a "paste" liquor, which is predominantly an aqueous solution of sodium chloride and calcium hypochlorite is continuously withdrawn from slurry chlorinator 2 and conveyed to cake separator 3.

Cake separator 3 is a filter, centrifuge, or other suitable solid-liquid separating apparatus capable of separating a moist cake of calcium hypochlorite dihydrate crystals from the aqueous solution of sodium chloride and calcium hypochlorite.

Moist cake from cake separator 3 generally contains from about 40 to about 60 percent by weight of calcium hypochlorite dihydrate, from about 2 to about 15 percent by weight of sodium chloride, and from about 40 to about 50 percent by weight of water. Moist cake is generally conveyed to dryer 4 where it is heated to remove most of the water. Dryer 4 is any suitable drying unit or units capable of reducing the moisture content of the calcium hypochlorite cake to the desired level without causing excess decomposition of the calcium hypochlorite particles.

Generally the water content of the calcium hypochlorite is reduced in dryer 4 to below about 10 percent by weight for example, in the range from about 0.5 to about 10, preferably from about 0.5 to about 8, and more preferably from about 0.5 to about 1.5 percent by weight. The calcium hypochlorite content of the dried calcium hypochlorite generally ranges from about 65 to about 85, and preferably from about 70 to about 80 percent by weight. The remainder of the dried calcium hypochlorite is predominantly sodium chloride. The dried product is then placed in suitable containers, with or without prior size classification or other processing such as pelletizing, prior to use in water treatment or other utility.

"Paste liquor" (or "paste filtrate" when cake separator 3 is a filter) is an aqueous sodium chloride solution from cake separator 3 which also contains soluble calcium hypochlorite. This paste liquor is conveyed to caustic reactor 5, which is any suitable mixing tank reactor provided with agitation means, where it is reacted with sodium hydroxide. The proportion of sodium hydroxide is at least sufficient to provide the stoichiometric proportion to react with all calcium hypochlorite present in the paste liquor in accordance with Equation (4):

$$2NaOH + Ca(ClO)_2 \rightarrow Ca(OH)_2 + 2NaClO \qquad (4)$$

However, a slight excess of sodium hydroxide, for example, from about 1 to 5 percent excess of sodium hydroxide by weight above the stoichometric proportion of preferably employed. This reaction in caustic reactor 5 forms a slurry of precipitated lime in an aqueous solution of sodium chloride and sodium hypochlorite, or "mother liquor". The resulting lime slurry is conveyed to lime separator 6 which is a solid-liquid separating apparatus such as a filter, centrifuge or other suitable apparatus. In lime separator 6, at least a portion of the mother liquor is separated from the lime slurry to form a more concentrated lime slurry or a moist lime cake which is recycled to mixing zone 1. Crystals of lime in the moist cake or concentrated slurry separated in lime separator 6 generally are finely divided amorphous crystals which are readily chlorinated in slurry chlorinator 2.

Mother liquor, the aqueous solution of sodium chloride and sodium hypochlorite recovered in lime separator 6, may be utilized as bleach liquor. This mother liquor contains essentially no calcium hypochlorite values. Therefore, a much larger percentage of lime fed into the system is recovered as large crystals of calcium hypochlorite rather than as an impurity in less expensive bleach liquor. However, mother liquor from lime separator 6 is preferably recycled to the process as described more fully below.

Figure 2:
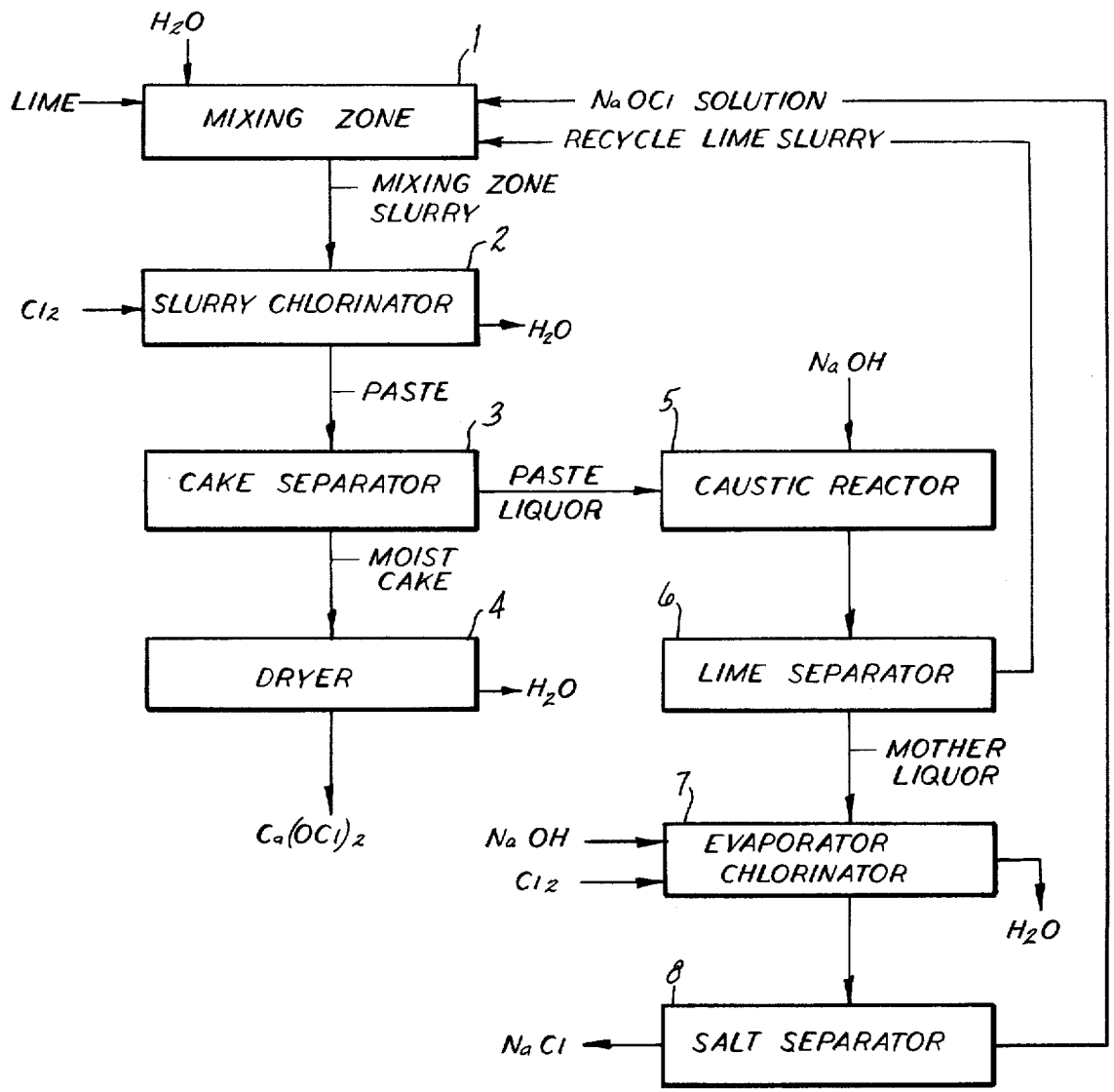
FIG. 2 is a flow sheet of another embodiment of the invention which includes the embodiment of FIG. 1 and also the steps of reacting lime depleted mother liquor with caustic and chlorine to form a slurry of solid sodium chloride in sodium hypochlorite solution and separating solid sodium chloride prior to recycle of the solution to the mixing zone.

FIG. 2 shows another embodiment of the invention which includes the embodiment described above in FIG. 1, as well as a technique for processing the aqueous solution of sodium chloride and sodium hypochlorite (mother liquor) separated from the lime slurry in lime separator 6. In FIG. 2, aqueous solution of sodium chloride and sodium hypochlorite from lime separator 6 is conveyed to evaporator-chlorinator 7 where the aqueous solution is concentrated by evaporation and is reacted with sodium hydroxide and chlorine to form a slurry of solid sodium chloride in an aqueous solution of sodium hypochlorite.

This evaporation and reaction is carried out in any suitable evaporation apparatus and chlorinator-reactor provided with agitation means. Simultaneous evaporation and chlorination may be carried out in an evaporative chlorinator using the avove-described chlorination technique described in U.S. Pat. No. 3,241,912 issued to Bernard H. NIcolaisen on Mar. 22, 1966.

In a preferred embodiment of the invention, the mother liquor is first concentrated by evaporation with steam, in an evaporator (not shown) and the resulting concentrated mother liquor is then reacted with chlorine and sodium hydroxide in evaporator-chlorinator 7, utilizing the heat of chlorination to complete evaporation of the mother liquor and effect precipitation of salt in the mother liquor.

Evaporation prior to reaction in evaporator-chlorinator 7 is generally more economical since the rate of evaporation of water is more rapid from the dilute mother liquor prior to reacting and therefore smaller, less expensive evaporators may be used than are required for the more concentrated slurry of salt and mother liquor.

In another embodiment of the invention, no chlorine or sodium hydroxide are added to evaporator-chlorinator 7 and only evaporation takes place in evaporator-chlorinator 7 to effect precipitation of salt in the mother liquor. The degree of evaporation will depend upon the initial mother liquor concentration.

When chlorination is used, the temperature during chlorination is generally maintained within the range from about 0° to about 35° and preferably from about 20° to about 30°C.

In the embodiment of FIG. 2, sufficient chlorine and sodium hydroxide are added to and sufficient water is removed from the mother liquor fed to evaporator-chlorinator 7 to maintain in the solution portion of the resulting slurry a sodium hypochlorite concentration within the range from about 15 to about 40 and preferably from about 25 to about 35 percent by weight. In addition, the soluble sodium chloride concentration in the solution portion of the slurry from evaporator-chlorinator 7 is maintained from about 4 to about 14 and preferably from about 4.8 to about 7.7 percent by weight. The solid sodium chloride concentration in the slurry from evaporator-chlorinator 7 ranges from about 15 to about 35, and preferably from about 20 to about 25 percent by weight. The resulting slurry is conveyed to salt separator 8, which is a suitable filter, centrifuge or similar solid-liquid separating apparatus. In salt separator 8, relatively pure sodium chloride crystals are separated from the aqueous sodium hypochlorite solution. These crystals may be used in the preparation of brine which is used as a feed material for electrolytic cells used in the preparation of chlorine and sodium hydroxide.

The aqueous solution of sodium hypochlorite which is also separated from salt separator 8, is recycled in mixing zone 1 for further admixing with fresh lime and recycled lime.

The embodiment of the invention set forth in FIG. 2 not only results in large crystals of calcium hypochlorite and more efficient utilization of calcium values as calcium hypochlorite, as in the embodiment of FIG. 1, but also produces relatively pure sodium chloride in solid form, which has utility in the preparation of brine feed for electrolytic cells. There are no impure aqueous solutions of sodium chloride, calcium hypochlorite or the like which need to be disposed of in the embodiment set forth in FIG. 2, thereby avoiding a serious pollution problem.

Figure 3:
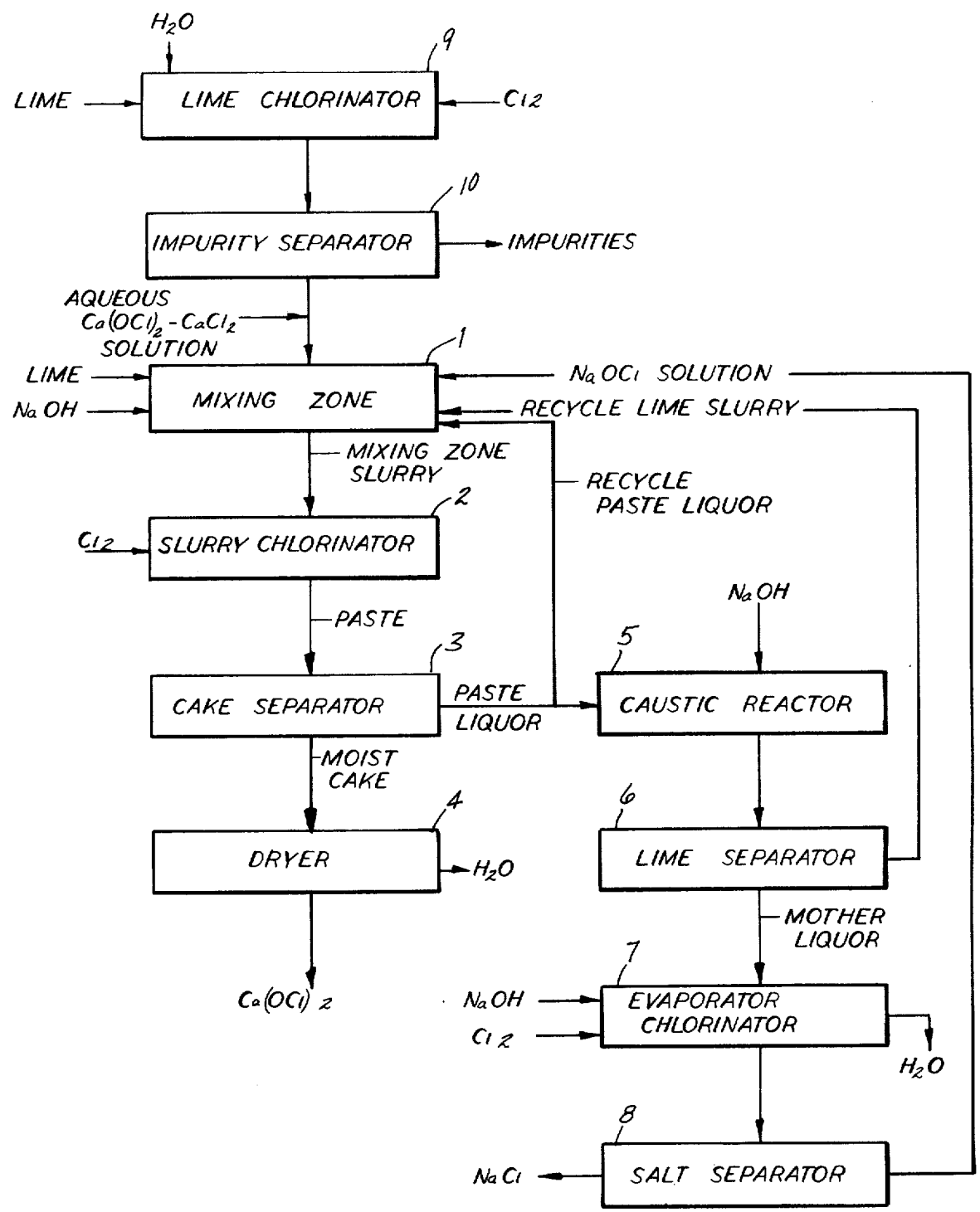
FIG. 3 is a flow sheet showing another embodiment of the invention including the embodiments of FIG. 2 as well as steps including lime purification, and recycle of a portion of the liquor remaining after separation of moist calcium hypochlorite cake.

FIG. 3 presents another embodiment of the invention which includes the embodiments of FIG. 2, as well as a technique for purifying at least a portion of the fresh lime fed to the process prior to admixing with sodium hypochlorite in mixing zone 1 and recycling at least a portion of the paste liquor to mixing zone 1.

In the embodiment of FIG. 3, an aqueous slurry of fresh lime is chlorinated in lime chlorinator 9 to form an aqueous solution of calcium hypochlorite and calcium chloride in accordance with Equation (1). Impurities in the fresh lime include insoluble impurities such as silica, aluminum salts, iron salts, magnesium salts, magnesia, unburned limestone (calcium carbonate and magnesium carbonate) and other compounds in trace quantities. These impurities present in the fresh lime remain insoluble in the aqueous solution formed in lime chlorinator 9 and form a slurry with the aqueous solution of calcium hypochlorite and calcium chloride. This slurry is conveyed to impurity separator 10, which is a suitable solid-liquid separator such as a filter, centrifuge or the like, where solid impurities are separated. Solid impurities from impurity separator 10 are generally disposed of as solid waste, land fill or the like. The aqueous solution of calcium hypochlorite and calcium chloride from impurity separator 10 is conveyed to mixing zone 1. As indicated above, the primary function of mixing zone 1 is to effect admixing of the components fed thereto. However, in the embodiment of FIG. 3, the calcium chloride component of the aqueous solution from impurity separator 10 is reacted in mixing zone 1 with sodium hypochlorite to form an aqueous solution of calcium hypochlorite and sodium chloride in accordance with Equation (3).

As indicated in FIG. 3, at least a portion of the fresh lime is purified in lime chlorinator 9 and impurity separator 10 prior to feeding to mixing zone 1, and a portion of the fresh lime fed to mixing zone 1 may be untreated. The ratio of fresh lime in each of these feed streams depends upon the initial purity and activity of the fresh lime fed to the process as well as specifications for impurities required for the calcium hypochlorite product. Thus, if the fresh lime is relatively pure and the standards for purity of the calcium hypochlorite are not high, then little or no fresh lime has to be purified prior to feeding to mixing zone 1. However, if the lime is relatively impure, then a large fraction or all of the fresh lime is purified in lime chlorinator 9 and impurity separator 10 prior to feeding to mixing zone 1.

In the embodiments of FIGS. 1-3, in order to maintain within the mixing zone slurry the concentration of lime (both fresh lime, if added, and recycled lime) within the desired range, and the concentration of sodium hypochlorite within the desired range, additional sodium hydroxide may be added to mixing zone 1. In addition, in order to improve control of the chlorination and heat transfer in slurry chlorinator 2 a portion of the paste liquor from cake separator 3 may be recycled to mixing zone 1.

The primary raw materials for the process of this invention are lime, sodium hydroxide, chlorine and water.

Fresh lime is added to the process at mixing zone 1 (FIGS. 1-3) and/or lime chlorinator 9 (FIG. 3). One of the advantages of this invention is that relatively impure lime may be utilized to prepare a relatively pure calcium hypochlorite product. For example, lime having an active lime content as low as 85 precent by weight or less may be added to lime chlorinator 9 in accordance with the process of this invention as described in FIG. 3, and produce a relatively pure calcium hypochlorite product. Generally the active lime content of the lime fed to lime chlorinator 9 and/or mixing zone 1 ranges from about 85 to about 100 percent, and preferably from about 90 to about 97 percent by weight of active lime. Lime impurities of the type described above may range from about 0 to about 15 percent and generally from about 3 to about 10 percent by weight of the lime.

Typical illustrative specifications for a preferred fresh limestone feed and for an acceptable limestone feed are as follows:

| Component | Preferred | Acceptable |
| --- | --- | --- |
| Ca(OH)$_2$ min.% | 95.0 | 85 |
| CaCO$_3$ max.% | 1.0 | 3.0 |
| MgO max.% | 0.5 | 3.5 |
| SiO$_2$ max.% | 0.5 | 2.5 |
| Fe$_2$O$_3$ + Al$_2$O$_3$ max.% | 0.5 | 1.5 |
| CaSO$_4$ max.% | 0.5 | 1.5 |

Generally from 0 to less than about ½ of the lime feed meeting the above-illustrative preferred specifications does not need to be processed in accordance with the lime purification embodiment of FIG. 3. However, when processing lime feed meeting the above illustrative acceptable specifications a major portion up to all of the feed may have to be processed in accordance with the lime purification embodiment of FIG. 3. The average particle size of fresh lime added to the process generally is substantially all −325 mesh (wet screen analysis) but particles up to about −200 mesh may be employed if desired.

When the impurity content of lime in the lime feed is greater than about 5 percent by weight, it may be desirable to add to lime chlorinator 9 a carbonating agent such as carbon dioxide or sodium carbonate to enhance precipitation and removal of the impurities in solid form from impurity separator 10.

As indicated above, fresh lime is fed to the system either through lime chlorinator 9 or mixing zone 1, or a combination of both. It is preferred to feed from about 25 to about 100 percent of the fresh lime into lime chlorinator 9, and any balance of fresh lime being fed into mixing zone 1. When all of the fresh lime is fed to lime chlorinator 9 then substantially all of the lime fed to mixing zone 1 is in the form of recycle lime slurry, the concentrated slurry of precipitated lime. Fresh lime is fed to lime chlorinator 9 and mixing zone 1 as an aqueous slurry containing from about 10 to about 50 percent, and preferably from about 15 to about 45 percent by weight of active lime.

Lime added to mixing zone 1 as recycle lime slurry from lime separator 6 is substantially pure lime, having an active lime content of from about 95 to about 100 percent by weight. The solid content of the recycle lime slurry generally ranges from about 25 to about 50 and preferably from about 35 to about 45 percent by weight of solids, which are predominately lime.

Sodium hydroxide is added to caustic reactor 5, evaporator chlorinator 7, and if desired to mixing zone 1, as a concentrated aqueous solution, generally ranging from about 40 to about 60 percent by weight of sodium hydroxide. However, sodium hydroxide may be added in anhydrous form to caustic reactor 5 and evaporator-chlorinator 7, and if desired, to mixing zone 1.

In addition, sodium hypochlorite added to mixing zone 1 in FIG. 1 may be prepared by chlorinating an aqueous solution of sodium hydroxide, in a suitable agitated chlorinator reactor (not shown). The sodium hydroxide concentration in the aqueous solution used to make sodium hypochlorite for feed to mixing zone 1 of FIG. 1 ranges from about 20 to about 75 and preferably from about 35 to about 55 percent by weight. As indicated in FIGS. 2 and 3, sodium hypochlorite solution is added to the mixing zone as a recycle stream from salt separator 8. Concentration of this recycle stream by evaporation in evaporator-chlorinator 7 is generally sufficient to maintain the desired sodium hypochlorite concentration in mixing zone 1. However, if desired, any necessary additional sodium hydroxide may be added directly to mixing zone 1 or additional sodium hypochlorite may be prepared by chlorinating an aqueous solution of sodium hydroxide and then added to mixing zone 1 as described above with respect to FIG. 1, or may be added to mother liquor prior to or simultaneous with chlorination in evaporator-chlorinator 7.

The overall reaction for the process of this invention may be illustrated by Equation (5):

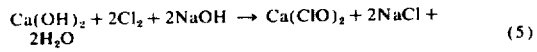

$$Ca(OH)_2 + 2Cl_2 + 2NaOH \rightarrow Ca(ClO)_2 + 2NaCl + 2H_2O \quad (5)$$

Thus, the stoichiometric proportion of fresh sodium hydroxide fed to the process is equivalent to two moles of sodium hydroxide per mole of active lime present in the fresh lime fed to the process. As indicated in the embodiment of FIG. 1, sodium hydroxide is fed to caustic reactor 5 and may be used to form sodium hypochlorite fed to mixing zone 1. In the embodiment of FIG. 2 sodium hydroxide is added to caustic reactor 5 and evaporator-chlorinator 7. In the embodiment of FIG. 3 sodium hydroxide is added to caustic reactor 5, and to either evaporator-chlorinator 7 or mixing zone 1, or both. The relative ratio of proportions of sodium hydroxide added to the different units of the different embodiments may be varied over a wide range. Generally, above about 20 and preferably from about 22 to about 35 percent of the stoichiometric proportion of sodium hydroxide required in Equation (5) is added to caustic reactor 5 to precipitate lime from the paste liquor. The balance of the stoichiometric proportion of sodium hydroxide is added in the embodiment of FIG. 1 as sodium hypochlorite to mixing zone 1. The balance of sodium hydroxide is added to evaporator-chlorinator 7 in the embodiment of FIG. 2. The balance of sodium hydroxide is added either entirely to evaporator-chlorinator 7 in the embodiment of FIG. 3, or up to about 70 percent of the balance of the stoichiometric proportion may be added to mixing zone 1.

In the embodiments of FIGS. 1 and 2, where lime (both fresh and recycled) and sodium hypochlorite solution are added to mixing zone 1, the resulting mixing zone slurry has a lime concentration ranging from about 1 to about 25 and preferably from about 2 to about 20 weight percent and a sodium hypochlorite concentration ranging from about 1.5 to about 25 and preferably from about 2 to about 20 percent by weight. In the embodiment of FIG. 3, when all or part of the fresh lime is purified in lime chlorinator 9 and impurity separator 10 to form an aqueous solution of calcium hypochlorite and calcium chloride which is fed to mixing zone 1, the resulting mixing zone slurry has a lime concentration and sodium hypochlorite concentration within the above ranges as well as a concentration of calcium hypochlorite ranging from about 0 to about 30, and preferably from about 10 to about 26 percent by weight. Substantially all of the calcium chloride fed to mixing zone 1 reacts with sodium hypochlorite to form calcium hypochlorite and sodium chloride in accordance with Equation (3).

The ultimate water content in the mixing zone slurry is controlled by adjusting the water content of the various feed streams to mixing zone 1. For example, the water content of the aqueous solution of calcium hypochlorite and calcium chloride (when lime purification of FIG. 3 is used), the water content of any lime slurry added, (either fresh or recycled lime) the water content of the sodium hypochlorite (either fresh sodium hypochlorite or recycled), and if desired, the quantity of recycled paste liquor from cake separator 3 are controlled to obtain a mixing zone slurry of the desired concentration range described above.

As indicated above, slurry-chlorinator 2 at start-up, is preferably filled with a slurry of calcium hypochlorite solids suspended in an aqueous solution of sodium chloride. The excess lime or other alkali in the slurry is maintained below about 1.0 and preferably less than about 0.5 percent by weight of the slurry. The feed rate of mixing zone slurry and chlorine to mixing slurry chlorinator 2 and the withdrawal rate of the resulting calcium hypochlorite paste are adjusted to achieve substantially complete chlorination of the calcium values fed to slurry chlorinator 2 in mixing zone slurry, while maintaining the free lime or alkali concentration in slurry chlorinator 2 preferably below about 1.0 percent by weight of the slurry.

Chlorine is added to slurry chlorinator 2 as well as evaporator-chlorinator 7 and lime chlorinator 9 in either gaseous or liquid form. The chlorination reactions are carried out preferably in an evaporator-type chlorinator of the type described above.

Paste from slurry chlorinator 2 is predominately a slurry of calcium hypochlorite in an aqueous solution of sodium chloride and calcium hypochlorite. The paste contains calcium hypochlorite dihydrate crystals in the concentration of from about 10 to about 35 and preferably from about 15 to about 30 percent by weight. These crystals are predominately rectangular platelets which are only a few microns in thickness, but have substantially equal sides ranging from about 50 to about 300 microns in length with the major portion having sides ranging from about 100 microns to about 250 microns in length. Generally, less than about 10 percent of the crystals are "twin crystals" which entrain paste liquor, which are difficult to separate from the paste liquor, and which are difficult to dry. Since more than about 90 percent of the calcium hypochlorite dihydrate crystals obtained by the process of this invention may be large platelets or cohesive agglomerates, there is a minimal amount of paste liquor entrained in the crystals during the separation in cake separator 3, even when filtered on a drum filter. The crystals are easier to separate from the paste liquor in cake separator 3 and are easier to dry in dryer 4 than crystals produced by conventional calcium hypochlorite techniques. In prior art techniques, more expensive high speed titanium centrifuges are necessary to obtain crystals of equivalent purity.

Moist cake from cake separator 3 contains from about 40 to about 60 percent by weight of $Ca(OCl)_2 \cdot 2H_2O$, from about 2 to about 15 percent by weight of NaCl, and from about 40 to 50 percent by weight of water. This moist cake may be used directly in the treatment of water systems such as swimming pools and the like, but is generally dried and stored prior to use. The moist cake is dried by known means, for example, using a spray dryer, turbodryer or vacuum dryer where the appropriate temperature ranges are employed to reduce the water content to the desired level. In the process of the present invention, the cake is dried, for example in a turbodryer with hot air while maintaining the product temperature in the range from about 35° to about 110°C, and preferably from about 40° to about 95°C. to give a product having a calcium hypochlorite content from about 65 to about 85, a water content below about 10 percent by weight and the bulk of the remainder being sodium chloride.

Paste liquor from cake separator 3 generally has a sodium chloride concentration ranging from about 15 to about 22 percent, and preferably from about 17 to about 20 percent by weight, a calcium hypochlorite concentration ranging from about 7 to about 15 percent and preferably from about 8 to about 12 percent by weight, and a water content ranging from about 60 to about 75 percent and preferably from about 68 to about 73 percent by weight.

As indicated in FIG. 3, a portion of the paste liquor may be recycled to mixing zone 1, if desired, to improve control of the chlorination and heat transfer in slurry chlorinator 2. Generally, from 0 to about 40 and preferably from about 0 to about 10 percent by weight of the paste liquor is recycled to mixing zone 1, the balance being conveyed to caustic reactor 5.

As discussed above, paste liquor is reacted with sodium hydroxide in caustic reactor 5 to precipitate lime and the resulting lime slurry is conveyed to lime separator 6. The lime slurry is concentrated in lime separator 6 to form a mother liquor containing from about 7 to about 20 and preferably from about 8 to about 15 percent by weight of sodium hypochlorite and from about 15 to about 22 and preferably from about 17 to about 20 percent by weight of sodium chloride. This mother liquor may be sold as bleach liquor but is preferably conveyed to evaporator-chlorinator 7 as described above, wherein it is reacted with chlorine and sodium hydroxide and evaporated to effect precipitation of sodium chloride. Sodium chloride is separated from the resulting solution in salt separator 8 and may be used to prepare a brine fed for electrolytic cells. The resulting aqueous solution from salt separator 8 contains from about 15 to about 40 and preferably from about 25 to about 35 percent by weight of sodium hypochlorite and from about 4 to about 14 and preferably from about 4.8 to about 7.7 percent by weight of sodium chloride.

Concentrated lime slurry recovered from lime separator 6 is recycled as recycled lime slurry to mixing zone 1. Recycled lime slurry contains from about 25 to about 50 and preferably from about 35 to about 45 percent by weight of solid lime having a purity of from about 95 percent to about 100 percent by weight of active lime. However, more concentrated lime slurries or cakes may be recovered from lime separator 6, if desired.

The process of the present invention is preferably carried out on a continuous basis which permits higher rates of chlorination and thus increased rates of production. Continuous chlorination also produces calcium hypochlorite dihydrate crystals which are more easily separated by the solid-liquid method of separation employed and which are easier to dry.

The reaction conditions during the chlorination steps have been described above. Generally, the evaporation steps are carried out at temperatures ranging from about 18° to about 40°C. and at pressures ranging from about 15 to about 35 mm Hg. All of the other steps of the process are carried out at ambient pressure and temperature conditions.

The following examples are presented to illustrate the invention more fully. All parts and percentages are by weight unless otherwise specified.

EXAMPLE 1

Using the process illustrated in FIG. 1, 100 parts per hour of a solution containing 31.33 percent NaOCl were admixed in mixing zone 1, an agitated vessel, with 81 parts per hour of an aqueous lime slurry containing 39 percent active lime. The slurry was prepared from 28 parts per hour of raw lime containing 92 percent $Ca(OH)_2$ (the balance being silica, iron oxide, aluminum oxide and the like), and 12.5 parts per hour of recycled precipitated lime from lime separator 6 as a 40 percent lime cake. The mixture was blended in the mixing zone to form a slurry, which was transferred to slurry chlorinator 2 where 29 parts per hour of gaseous chlorine were added while the slurry was thoroughly agitated and the temperature maintained at about 30°C. The calcium hypochlorite paste which formed in slurry chlorinator 2 contained calcium hypochlorite dihydrate crystals in an aqueous NaCl solution. This paste was withdrawn from the slurry chlorinator at the rate of about 210 parts per hour. The paste contained 28.6 percent $Ca(OCl)_2$, 14.9 percent NaCl and 56.6 percent $H_2O$.

The feed rate of mixing zone slurry and chlorine and the withdrawal rate of paste from slurry chlorinator 2 were adjusted to maintain concentration of free alkali in slurry chlorinator 2 of less than about 0.5 percent.

The resulting paste was conveyed to cake separator 3, which was a filter, where the paste was separated into a moist cake and a paste liquor. The crystals of the calcium hypochlorite dihydrate in the moist cake were flat platelets of a few microns in thickness and sides which ranged from about 50 to about 300 microns in length with about 70 to about 90 percent of the crystals being larger than 100 microns in length.

Moist cake was removed from the filter at a rate of 116 parts per hour. The moist cake which contained 43.3 percent $Ca(OCl)_2$, 10.4 percent NaCl and 46.3 percent $H_2O$ was transferred to a dryer and dried with hot air while maintaining the product temperature in the range of from 45° to 90°C. A dried calcium hypochlorite product was recovered from the dryer at the rate of 58 parts per hour, containing about 74 percent $Ca(OCl)_2$, 19 percent NaCl and having a water content of less than 1 percent, the balance being calcium chloride (3.0%), calcium chlorate (0.7%), calcium hydroxide (1.5%) and calcium carbonate (0.7%). From the filter, 95 parts per hour of paste liquor containing about 10.1 percent Ca(OCl)$_2$, 20.2 percent NaCl and 69.6 percent H$_2$O were recovered and transferred to a caustic reactor 5. In caustic reactor 5, paste liquor was reacted with 10.8 parts per hour of a 50 percent aqueous NaOH solution. Lime was precipitated in a mother liquor to give 105.4 parts per hour of 4.7 percent slurry of active lime containing 99 percent Ca(OH)$_2$. This slurry was concentrated in a lime separator 6 to give 12.5 parts per hour of a concentrated recycle lime slurry containing 40 percent by weight of lime, which was recycled to mixing zone 1.

Clarified mother liquor was recovered from lime separator 6 at the rate of about 82.1 parts per hour, and stored for use as a liquid bleach.

EXAMPLE 2

Using the process illustrated in FIG. 2, 2739 parts per hour of a sodium hypochlorite solution containing 31.5 percent NaOCl, 6.9 percent NaCl and 62 percent H$_2$O were added to mixing zone 1. An aqueous lime slurry containing 33 percent active lime, prepared from lime having an active lime content of about 90 percent, was added at the rate of 700 parts per hour along with 148 parts per hour of recycled lime as a 40 percent slurry containing 99 percent active lime. The mixture was agitated to give 5000 parts per hour of a slurry containing 17.71 percent Ca(OH)$_2$, 17.25 percent NaOCl, 4.43 percent NaCl and 60.61 percent H$_2$O. This slurry was pumped to slurry chlorinator 2 where it was reacted with chlorine while the temperature was maintained at about 25°C. Excess alkali in the resulting paste in slurry chlorinator 2 was maintained below about 0.50 percent. Paste, at the rate of 5814 parts per hour was withdrawn from slurry chlorinator 2 and conveyed to a filter. The paste contained 28.21 percent Ca(OCl)$_2$, 0.42 percent Ca(OH)$_2$, 0.42 percent CaCl$_2$, 14.75 percent NaCl and 56.20 percent H$_2$O. In the filter, 3074 parts per hour of a moist cake containing 44.05 percent Ca(OCl)$_2$, 10.17 percent NaCl and 45.78 percent H$_2$O was separated from paste liquor. This moist cake was transferred to a dryer where the water content was reduced to provide 1680 parts per hour of a product containing 73 percent Ca(OCl)$_2$, 19 percent NaCl and about 1 percent H$_2$O.

Paste liquor was pumped to the caustic reactor at 2748 parts per hour. In the caustic reactor, addition of 320 parts per hour of a 50 percent NaOH solution precipitated lime which was concentrated in a centrifuge to a 40 percent slurry and recycled to the mixing zone 1. Mother liquor at the rate of 2700 parts per hour and containing 10.19 percent NaOCl, 18.68 percent NaCl and 71.13 percent H$_2$O were recovered and pumped to evaporator-chlorinator 7 where 1496 parts per hour of a 50 percent NaOH solution were added along with gaseous chlorine. The solution was concentrated by evaporative chlorination at a temperature of 25°C. and under a vacuum of 18 mm. pressure. The concentrated solution was centrifuged to remove 890 parts per hour of NaCl crystals. Sodium hypochlorite solution was obtained at the rate of 2739 parts per hour and recycled to mixing zone 1.

EXAMPLE 3

Employing the process shown in FIG. 3, a slurry containing 18 percent lime and 82 percent water was pumped to lime chlorinator 9 and chlorine introduced while maintaining an excess of alkali at 0.05 to 0.75 weight percent and a temperature of 30°C. The chlorinated slurry produced was centrifuged to remove insoluble impurities and 320 parts per hour of the resulting solution was recovered containing 14.54 percent Ca(OCl)$_2$, 11.96 percent CaCl$_2$, 0.07 percent Ca(OH)$_2$ and 73.43 percent H$_2$O. This solution was pumped to mixing zone 1 together with 150 parts per hour of recycle paste liquor having an analysis of Ca(OCl)$_2$ = 10.35 percent, CaCl$_2$ = 0.35 percent, NaCl = 17.13 percent and H$_2$O = 72.12 percent. Sodium hypochlorite solution (137 parts per hour) containing 31.33 percent NaOCl was added along with 32 parts per hour of 50 percent NaOH and 7 parts per hour recycled lime to produce a slurry containing about 2.5 weight percent of solids in mixing zone 1. Evaporative chlorination of this slurry in a chlorinator at 30°C. and at a pressure of 25 mm., while maintaining 0.25 to 0.5 weight percent excess alkali, gave 600 parts per hour of a paste containing about 15 weight percent of solids. The paste was filtered to give 199 parts per hour of moist cake containing 81.25 percent Ca(OCl)$_2$ on a dry basis and 40 percent H$_2$O. The moist cake was dried to give 94 parts per hour of a product containing 72.08 percent Ca(OCl)$_2$ having a sodium chloride content of 17 percent. Of the total of 379 parts per hour of paste liquor recovered from the filter, 150 parts per hour of paste liquor was returned to the reactor as recycle paste liquor. The remaining paste filtrate (247 parts per hour) was reacted with sodium hydroxide to form a lime slurry containing about 5.35 percent of solids in dilute sodium hypochlorite solution. This lime slurry was thickened to a slurry containing about 40 percent of solids, filtered and recycled to mixing zone 1. The remaining mother liquor was treated with sodium hydroxide and chlorine in an evaporative chlorinator at 27°C. and 15 mm. Hg. absolute pressure. The resulting slurry was then filtered to remove NaCl crystals and 137 parts sodium hypochlorite solution were recycled to the mixing zone 1.

EXAMPLE 4

Following the procedure of FIG. 1, to mixing zone 1 were added 105 parts per hour of lime (95 percent active lime), 370 parts per hour of 32% sodium hypochlorite solution and 195 parts per hour of water. The resulting slurry was conveyed to slurry chlorinator 2 at the rate of 683 parts per hour and chlorinated therein with chlorine at the rate of 114 parts of chlorine per hour. The resulting calcium hypochlorite paste was withdrawn at the rate of 797 parts per hour.

The feed rate of the mixing zone slurry and chlorine and the withdrawal rate of calcium hypochlorite paste were adjusted to maintain a free-alkali concentration in slurry chlorinator 2 of less than about 0.50 percent.

The resulting paste from slurry chlorinator 2 was conveyed to cake separator 3, where the paste was filtered to form a moist cake and a paste liquor. The moist cake was withdrawn from the filter at the rate of 436 parts per hour and conveyed to dryer 4, which was a horizontal hearth furnace which utilized hot air in counter-current flow to the moist cake to effect drying thereof. Water was removed from the dryer at the rate of 209 parts per hour, and dry particles of calcium hypochlorite dihydrate containing about 0.5 percent of water were removed from dryer 4 at the rate of 227 parts per hour. The dry calcium hypochlorite crystals contained about 72 percent calcium hypochlorite.

The paste liquor, which was removed from the filter at the rate of 361 parts per hour, was conveyed to caustic reactor 5 where it was reacted with 41.3 parts per hour of a 50 percent aqueous sodium hydroxide solution to form a slurry by precipitating solid lime particles in an aqueous solution of sodium hypochlorite and sodium chloride. The resulting slurry was conveyed at the rate of 402 parts per hour to lime separator 6 where a 40 percent slurry of lime suspended in aqueous solution was removed and recycled to mixing zone 1 at the rate of 47 parts per hour.

Mother liquor, which was an aqueous solution of sodium chloride and sodium hypochlorite, was removed from lime separator 6 at the rate of 355 parts per hour and stored for use as bleach liquor.

EXAMPLE 5

Following the procedure of FIG. 2, to mixing zone 1 were added 104 parts per hour of lime (95 percent active lime), 368 parts per hour of recycled sodium hypochlorite solution and 192 parts per hour of water. The resulting slurry was conveyed to slurry chlorinator 2 at the rate of 682 parts per hour and chlorinated therein with gaseous chlorine at the rate of 116 parts of chlorine per hour. The resulting calcium hypochlorite paste was withdrawn at the rate of 798 parts per hour.

The feed rate of the mixing zone slurry and chlorine and the withdrawal rate of calcium hypochlorite paste were adjusted to maintain a free-alkali concentration in slurry chlorinator 2 of less than about 0.50 percent.

The resulting paste from slurry chlorinator 2 was conveyed to cake separator 3, where the paste was filtered to form a moist cake and a paste liquor. The moist cake was withdrawn from the filter at the rate of 449 parts per hour and conveyed to dryer 4, which was a horizontal hearth furnace which utilized hot air in counter-current flow to the moist cake to effect drying thereof. Water was removed from the dryer at the rate of 215 parts per hour, and dry particles of calcium hypochlorite dihydrate containing about 0.5 percent of water were removed from dryer 4 at the rate of 234 parts per hour. The dry calcium hypochlorite crystals contained about 72 percent calcium hypochlorite.

The paste liquor, which was removed from the filter at the rate of 349 parts per hour, was conveyed to caustic reactor 5 where it was reacted with 40 parts per hour of a 50 percent aqueous sodium hydroxide solution to form a slurry by precipitating solid lime particles in an aqueous solution of sodium hypochlorite and sodium chloride. The resulting slurry was conveyed at the rate of 389 parts per hour to lime separator 6 where a slurry of lime suspended in the aqueous solution was removed and recycled to mixing zone 1 at the rate of 18 parts per hour.

Mother liquor, which was an aqueous solution of sodium chloride and sodium hypochlorite, was removed from lime separator 6 at the rate of 371 parts per hour and conveyed to evaporator chlorinator 7. A 50 percent aqueous solution of sodium hydroxide was added to evaporator chlorinator 7 at the rate of 188 parts per hour and gaseous chlorine was added to evaporator chlorinator 7 at the rate of 84 parts per hour. Water was evaporated from evaporator chlorinator 7 at the rate of 154 parts per hour. The resulting slurry of sodium chloride crystals in an aqueous sodium hypochlorite solution was removed from evaporator chlorinator 7 at the rate of 489 parts per hour. This sodium chloride slurry was conveyed to salt separator 8 which was a filter, where sodium chloride was separated from the aqueous solution of sodium hypochlorite. Sodium chloride crystals were removed from the filter at the rate of 121 parts per hour and stored for use in the preparation of a brine, which was used as a feed to an electrolytic mercury cell used in the generation of chlorine. Aqueous solution of sodium hypochlorite was removed from salt separator 8 at the rate of 368 parts per hour, and recycled to mixing zone 1.

EXAMPLE 6

Following the procedure of FIG. 3, gaseous chlorine was fed at the rate of 33.6 parts per hour to lime chlorinator 9 along with 197 parts per hour of an aqueous slurry containing 17.8 percent active lime. The lime used to make the aqueous slurry contained about 92 percent calcium hydroxide, the balance being silica, salts of iron and aluminum and unburned limestone. The resulting slurry, which was an aqueous solution of calcium hypochlorite and calcium chloride containing undissolved soluble impurities, was withdrawn from lime chlorinator 9 at the rate of 230.6 parts per hour and conveyed to impurity separator 10, which was a filter. Solid impurities including iron and aluminum salts, silica and the like were separated from the filter at the rate of 0.6 parts per hour and fed to solid waste disposal. An aqueous solution of calcium hypochlorite and calcium chloride was withdrawn from the filter at the rate of 330 parts per hour and conveyed to a mixing zone where it was admixed with 19 parts of a 50 percent aqueous solution of sodium hydroxide, 109 parts of recycled sodium hypochlorite, 8 parts of a recycled lime slurry, and 58 parts of a recycled paste liquor.

The resulting mixing zone slurry was conveyed to slurry chlorinator 2 at the rate of 424 parts per hour and chlorinated therein with gaseous chlorine at the rate of 16 parts of chlorine per hour. The resulting calcium hypochlorite paste was withdrawn at the rate of 370 parts per hour.

The feed rate of the mixing zone slurry and chlorine and the withdrawal rate of calcium hypochlorite paste were adjusted to maintain a free-alkali concentration in slurry chlorinator 2 of less than about 0.50 percent.

The resulting paste from slurry chlorinator 2 was conveyed to cake separator 3, where the paste was filtered to form a moist cake and a paste liquor. The moist cake was withdrawn from the filter at the rate of 152 parts per hour and conveyed to dryer 4, which was a horizontal hearth furnace which utilized hot air in counter-current flow to the moist cake to effect drying thereof. Water was removed from the dryer at the rate of 72 parts per hour, and dry particles of calcium hypochlorite dihydrate containing about 0.5 percent of water were removed from dryer 4 at the rate of 79 parts per hour. The dry calcium hypochlorite crystals contained about 72 percent calcium hypochlorite.

The paste liquor, which was removed from the filter at the rate of 160 parts per hour, was conveyed to caustic reactor 5 where it was reacted with 18 parts per hour of a 50 percent aqueous sodium hydroxide solution to form a slurry by precipitating solid lime particles in an aqueous solution of sodium hypochlorite and sodium chloride. The resulting slurry was conveyed at the rate of 178 parts per hour to lime separator 6 where a slurry of lime suspended in the aqueous solution was removed and recycled to mixing zone 1 at the rate of 8 parts per hour.

Mother liquor, which was an aqueous solution of sodium chloride and sodium hypochlorite, was removed from lime separator 6 at the rate of 170 parts per hour and conveyed to evaporator chlorinator 7. A 50 percent aqueous solution of sodium hydroxide was added to evaporator chlorinator 7 at the rate of 39 parts per hour and gaseous chlorine was added to evaporator chlorinator 7 at the rate of 17 parts per hour. Water was evaporated from evaporator chlorinator 7 at the rate of 77 parts per hour. The resulting slurry of sodium chloride crystals in an aqueous sodium hypochlorite solution was removed from evaporator chlorinator 7 at the rate of 149 parts per hour. This sodium chloride slurry was conveyed to salt separator 8 which was a filter, where sodium chloride was separated from the aqueous solution of sodium hypochlorite. Sodium chloride crystals were removed from the filter at the rate of 40 parts per hour and stored for use in the preparation of a brine, which was used as a feed to an electrolytic mercury cell used in the generation of chlorine. Aqueous solution of sodium hypochlorite was removed from salt separator 8 at the rate of 109 parts per hour, and recycled to mixing zone 1.

EXAMPLE 7

Following the procedure of FIG. 3, gaseous chlorine was fed at the rate of 284 parts per hour to lime chlorinator 9 along with 1682 parts per hour of an aqueous slurry containing 17.8 percent active lime. The lime used to make the aqueous slurry contained about 95 percent calcium hydroxide, the balance being silica and salts of iron and aluminum. The resulting slurry, which was an aqueous solution of calcium hypochlorite and calcium chloride containing dissolved soluble impurities, was withdrawn from lime chlorinator 9 at the rate of 1966 parts per hour and conveyed to impurity separator 10, which was a filter. Solid impurities including iron and aluminum salts, silica and the like were separated from the filter at the rate of 39 parts per hour and fed to solid waste disposal. An aqueous solution of calcium hypochlorite and calcium chloride was withdrawn from the filter at the rate of 1927 parts per hour and conveyed to a mixing zone where it was admixed with 429 parts of a 95 percent active calcium hydroxide lime, 2652 parts of recycled sodium hypochlorite and 134 parts of a recycled lime slurry at 40 percent active lime content.

The resulting mixing zone slurry was conveyed to slurry chlorinator 2 at the rate of 5134 parts per hour and chlorinated therein with gaseous chlorine at the rate of 510 parts of chlorine per hour. The resulting calcium hypochlorite paste was withdrawn at the rate of 5644 parts per hour.

The feed rate of the mixing zone slurry and chlorine and the withdrawal rate of calcium hypochlorite paste were adjusted to maintain a free-alkali concentration in slurry chlorinator 2 of less than about 0.50 percent.

The resulting paste from slurry chlorinator 2 was conveyed to cake separator 3, where the paste was filtered to form a moist cake and a paste liquor. The moist cake was withdrawn from the filter at the rate of 3052 parts per hour and conveyed to dryer 4, which was a horizontal hearth furnace which utilized hot air in counter-current flow to the moist cake to effect drying thereof. Water was removed from the dryer at the rate of 1378 parts per hour, and dry particles of calcium hypochlorite dihydrate containing about 0.5 percent of water were removed from dryer 4 at the rate of 1666 parts per hour. The dry calcium hypochlorite crystals contained about 72 percent calcium hypochlorite.

The paste liquor, which was removed from the filter at the rate of 2589 parts per hour, was conveyed to caustic reactor 5 where it was reacted with 291 parts per hour of a 50 percent aqueous sodium hydroxide solution to form a slurry by precipitating solid lime particles in an aqueous solution of sodium hypochlorite and sodium chloride. the resulting slurry was conveyed at the rate of 2880 parts per hour to lime separator 6 where a slurry of lime suspended in the aqueous solution was removed and recycled to mixing zone 1 at the rate of 135 parts per hour.

Mother liquor, which was an aqueous solution of sodium chloride and sodium hypochlorite, was removed from lime separator 6 at the rate of 2745 parts per hour and conveyed to evaporator chlorinator 7. A 50 percent aqueous solution of sodium hydroxide was added to evaporator chlorinator 7 at the rate of 1254 parts per hour and gaseous chlorine was added to evaporator-chlorinator 7 at the rate of 556 parts per hour. Water was evaporated from evaporator-chlorinator 7 at the rate of 1086 parts per hour. The resulting slurry of sodium chloride crystals in an aqueous sodium hypochlorite solution was removed from evaporator-chlorinator 7 at the rate of 3470 parts per hour. This sodium chloride slurry was conveyed to salt separator 8 which was a filter, where sodium chloride was separated from the aqueous solution of sodium hypochlorite. Sodium chloride crystals were removed from the filter at the rate of 818 parts per hour and stored for use in the preparation of a brine, which was used as a feed to an electrolytic mercury cell used in the generation of chlorine. Aqueous solution of sodium hypochlorite was removed from salt separator 8 at the rate of 2652 parts per hour, and recycled to mixing zone 1.

What is desired to be secured by Letters Patent is:

1. A continuous process for preparing calcium hypochlorite which comprises:
   A. admixing lime, alkali metal hypochlorite and water in a mixing zone to form a mixing zone slurry,
   B. reacting said mixing zone slurry with chlorine to form a paste comprised of
      1. solid calcium hypochlorite dihydrate particles suspended in
      2. a paste liquor comprised of an aqueous solution of
         a. alkali metal chloride, and
         b. dissolved calcium hypochlorite,
   C. continuously withdrawing a portion of said paste and separating it into
      1. said paste liquor, and
      2. a moist cake of said solid calcium hypochlorite dihydrate particles,
   D. reacting said paste liquor with a hydroxide of an alkali metal to form a slurry of precipitated lime in a mother liquor predominating in alkali metal hypochlorite and alkali metal chloride, and
   E. recycling said precipitated lime to said mixing zone.

2. The process of claim 1 wherein:
   B. said mixing zone slurry is reacted with chlorine while maintaining a free-alkali concentration in the resulting chlorinated slurry below about 1.0 percent by weight, and wherein
   D. said paste liquor is reacted with sufficient alkali metal hydroxide to react with substantially all of said calcium hypochlorite present in said paste liquor to form a slurry of precipitated lime in a mother liquor predominating in alkali metal hypochlorite and alkali metal chloride, and
1. separating said precipitated lime from a portion of said mother liquor and
   a. recycling said separated precipitated lime to said mixing zone.

3. The process of claim 2 wherein said moist cake is heated to dry the particles of calcium hypochlorite dihydrate particles.

4. The process of claim 3 wherein:
D. said slurry of precipitated lime in mother liquor is separated into
  1. a concentrated slurry of precipitated lime, and
  2. a clarified mother liquor,
E. said concentrated slurry of precipitated lime is recycled to said mixing zone,
F. evaporating said clarified mother liquor to effect precipitation of said chloride of said alkali metal in said clarified mother liquor,
G. reacting said clarified mother liquor with chlorine and a hydroxide of an alkali metal to form an aqueous solution containing a hypochlorite and a solid chloride of said alkali metal,
H. separating said solid chloride from said aqueous solution, and
I. recycling said aqueous solution of said hypochlorite of said alkali metal to said mixing zone.

5. The process of claim 4 wherein said alkali metal is sodium.

6. The process of claim 5 wherein said mixing zone slurry has a lime concentration ranging from about 1 to about 25 percent by weight, a sodium hypochlorite concentration ranging from about 1.5 to about 25 percent by weight, and a calcium hypochlorite concentration ranging from about 0 to about 30 percent by weight.

7. The process of claim 4 wherein the concentration of solid calcium hypochlorite dihydrate in said paste ranges from about 10 to about 35 percent by weight.

8. The process of claim 7 wherein said paste liquor has a concentration of sodium chloride ranging from about 15 to about 22 and a calcium hypochlorite ranging from about 7 to about 15 percent by weight.

9. The process of claim 8 wherein said calcium hypochlorite particles after drying contain from about 0.5 to about 10 percent water, from about 65 to about 85 percent by weight of calcium hypochlorite, and the bulk of the remainder is sodium chloride.

10. The process of claim 9 wherein said concentrated slurry of precipitated lime has a lime concentration ranging from about 25 to about 50 percent by weight, and wherein said clarified mother liquor is an aqueous solution containing from about 15 to about 22 percent by weight of sodium chloride and from about 7 to about 20 percent by weight of sodium hypochlorite.

11. The process of claim 10 wherein sufficient sodium hydroxide and chlorine are reacted with said clarified mother liquor and sufficient water is evaporated from said clarified mother liquor to form a salt slurry containing from about 15 to about 35 percent by weight of solid sodium chloride in an aqueous solution containing from about 15 to about 40 percent by weight of sodium hypochlorite and from about 4 to about 14 percent by weight of soluble sodium chloride.

12. The process of claim 11 wherein a portion of said paste liquor is recycled to said mixing zone.

13. The process of claim 12 wherein said mixing zone slurry has a lime concentration ranging from about 2 to about 20 percent by weight, a sodium hypochlorite concentration ranging from about 2 to about 20 percent by weight and a calcium hypochlorite concentration ranging from about 10 to about 26 percent by weight.

14. The process of claim 13 wherein the concentration of solid calcium hypochlorite dihydrate in said paste ranges from about 15 to about 30 percent by weight.

15. The process of claim 14 wherein said paste liquor has a concentration of sodium chloride ranging from about 17 to about 20 and a calcium hypochlorite concentration ranging from about 8 to about 12 percent by weight.

16. The process of claim 15 wherein said calcium hypochlorite particles after drying contain from about 0.5 to about 8 percent water, from about 70 to about 80 percent by weight of calcium hypochlorite and the bulk of the remainder is sodium chloride.

17. The process of claim 16 wherein said concentrated slurry of precipitated lime has a lime concentration ranging from about 35 to about 45 percent by weight, and wherein said clarified mother liquor is an aqueous solution containing from about 17 to about 20 percent by weight of sodium chloride and from about 8 to about 15 percent by weight of sodium hypochlorite.

18. The process of claim 17 wherein sufficient sodium hydroxide and chlorine are reacted with said clarified mother liquor and sufficient water is evaporated from said clarified mother liquor to form a salt slurry containing from about 20 to about 25 percent by weight of solid salt in an aqueous solution containing from about 25 to about 35 percent by weight of sodium hypochlorite and from about 4.8 to about 7.7 percent by weight of soluble sodium chloride.

19. The process of claim 5 wherein evaporating and reacting of said clarified mother liquor is effected by first evaporating said clarified mother liquor and then reacting the resulting concentrated clarified mother liquor with said chlorine and said sodium hydroxide.

20. The process of claim 5 wherein said clarified mother liquor is simultaneously evaporated and reacted with said chlorine and said sodium hydroxide.

* * * * *